(12) United States Patent
Tadokoro et al.

(10) Patent No.: US 6,200,672 B1
(45) Date of Patent: Mar. 13, 2001

(54) SURFACE-TREATED METAL PLATE AND METAL SURFACE TREATING FLUID

(75) Inventors: Kenichiro Tadokoro; Hiromasa Shoji; Masao Sakashita, all of Chiba (JP)

(73) Assignee: Nippon Steel Corporation, Tokyo (JP)

( * ) Notice: Subject to any disclaimer, the term of this patent is extended or adjusted under 35 U.S.C. 154(b) by 0 days.

(21) Appl. No.: 09/402,917

(22) PCT Filed: Apr. 24, 1998

(86) PCT No.: PCT/JP98/01915

§ 371 Date: Oct. 13, 1999

§ 102(e) Date: Oct. 13, 1999

(87) PCT Pub. No.: WO98/48075

PCT Pub. Date: Oct. 29, 1998

(30) Foreign Application Priority Data

Apr. 24, 1997 (JP) .................................................... 9-106518

(51) Int. Cl.$^7$ .................................................... B32B 5/16
(52) U.S. Cl. .................. 428/328; 428/328; 428/469; 428/470; 428/659; 428/621; 428/623; 428/689; 148/259; 148/260; 148/261; 148/273; 148/274; 148/275; 148/283; 106/14.12; 106/14.13; 106/14.14; 106/14.15; 106/14.21; 106/218; 106/287.32; 106/287.35; 106/287.29

(58) Field of Search ..................................... 428/469, 470, 428/659, 621, 623, 689, 328; 148/259, 260, 261, 273–275, 283; 106/14.12–14.15, 14.21, 14.27–14.29, 14.31, 14.33, 14.44, 218, 287.29, 287.32, 287.35

(56) References Cited

U.S. PATENT DOCUMENTS 5,897,948 * 4/1999 Sakon et al. ........................ 428/328

FOREIGN PATENT DOCUMENTS

| 62-23989 | 1/1987 | (JP) . |
| 2-22556 | 1/1990 | (JP) . |
| 3-183790 | 8/1991 | (JP) . |
| 8-48916 | 2/1996 | (JP) . |

* cited by examiner

Primary Examiner—Deborah Jones
Assistant Examiner—Lymarie Miranda
(74) Attorney, Agent, or Firm—Kenyon & Kenyon

(57) ABSTRACT

A surface treated metal sheet which is coated with a layer comprising, as main components, a complex and/or salt between a rare earth metal element and an organic compound having in the molecule one or more functional groups selected from among —O—, =O, —OH, —COOH, —NH$_2$, =NH, =N—, —SH, —SO$_3$H and phosphoric groups, and a matrix which physically holds the above and has adhesive power for metal sheets, as well as a metal surface treatment solution used therefor.

22 Claims, 1 Drawing Sheet

SURFACE-TREATED METAL PLATE AND METAL SURFACE TREATING FLUID

TECHNICAL FIELD

The present invention relates to a surface treated metal sheet and a treatment solution therefor and, especially, it relates to a surface treated metal sheet with excellent corrosion resistance and having a coating layer containing absolutely no hexavalent chromium, and to a treatment solution for the same.

BACKGROUND ART

Rust-proof properties have conventionally been imparted to cold-rolled steel sheets, galvanized steel sheets, zinc-based alloy-plated steel sheets and aluminum-plated steel sheets used for automobiles, electrical appliances, building materials and the like, usually by coating their surfaces with chromate layers. Chromating treatment includes electrolytic chromating and application chromating. Electrolytic chromating is accomplished, for example, by using a bath composed mainly of chromic acid and also containing other anions such as sulfate, phosphate, borate and halogens, for treatment of the metal sheet by cathodic electrolytic treatment. Application chromating is designed in consideration of the problem of elution of chromium from chromated metal sheets, and it thus involves preparation of a treatment solution by adding an inorganic colloid or inorganic anion to a solution with a portion of the hexavalent chromium portion reduced to trivalent chromium beforehand or to a solution with a specified ratio of hexavalent chromium to trivalent chromium, and immersing the metal sheet therein or spraying the metal sheet with the treatment solution.

Of such chromate layers, those chromate layers formed by electrolysis cannot be said to have sufficient corrosion resistance despite the low elution of hexavalent chromium, and there is particular loss of corrosion resistance in cases where considerable layer damage occurs during working, etc. On the other hand, while metal sheets coated with application chromated layers have high corrosion resistance and especially high excellent corrosion resistance of worked sections, elution of hexavalent chromium from the chromate layers has been a problem. Elution of hexavalent chromium can be considerably reduced by coating with organic polymers, but this is still inadequate. Although an improvement in reducing elution of hexavalent chromium can generally be achieved by a method known as resin chromating treatment, such as disclosed in Japanese Unexamined Patent Publication No. 5-230666, it is still impossible to avoid trace elution.

Thus, in order to completely inhibit elution of hexavalent chromium it is necessary to develop a corrosion-resistant layer that uses absolutely no hexavalent chromium but has functions equivalent to conventional chromate layers containing hexavalent chromium.

One previous anti-corrosion technique for incorporating absolutely no hexavalent chromium is a method under development which uses an organic-based corrosion inhibitor. As such organic-based corrosion inhibitors there are known carboxylates such as benzoates, azelates, etc. and compounds containing —S—, —N— which readily interact with metal ions, as well as complexes thereof.

As techniques for including organic-based corrosion inhibitors in layers there have been proposed, for example, the hydrooxime complex of zinc disclosed in Japanese Unexamined Patent Publication No. 62-23989, the metal chelate compounds of Mg, Ca, Ba, Zn, Al, Ti, Zr, Sn, Ni, etc. disclosed in Japanese Unexamined Patent Publication No. 3-183790 and Japanese Unexamined Patent Publication No. 2-222556, the alkali earth metal salts, transition metal salts and transition metal complexes of organic compounds disclosed in Japanese Unexamined Patent Publication No. 6-321851, and the titanium and zirconium complexes of carboxylic acids disclosed in Japanese Unexamined Patent Publication No. 8-48916. These corrosion inhibitors, however, have weak anti-corrosion effects due to the metal elements forming the complexes and thus have failed to provide the same function as hexavalent chromium. In particular, almost no corrosion resistance can be expected at damaged sections or at the locations of layer defects produced during working.

Japanese Unexamined Patent Publication No. 7-188951 discloses a rare earth metal-organic chelate compound for the purpose of inhibiting corrosion of metals that contact solutions, such as radiators or pipes. This corrosion inhibitor was designed as a water-soluble compound, to allow continuous provision of the corrosion inhibitor to corrosion sites by circulation of the solution. Consequently, although the strong anti-corrosion effect of the rare earth metal element is utilized, with layers on metal sheets wherein the absolute amount of corrosion inhibitor onto the corrosion sites is limited by the coating coverage, elution occurs out of the layer in humid atmospheres so that long-term corrosion resistance comparable to chromate layers cannot be achieved.

DISCLOSURE OF THE INVENTION

In light of these problems, it is an object of the present invention to provide a surface treated metal sheet that has excellent corrosion resistance, particularly when the layer undergoes damage due to working or damage and which can substitute for a chromate layer, as well as a treatment solution therefor.

As a result of much diligent research by the present inventors in designing general purpose chemical treatment layers for use in systems containing absolutely no hexavalent chromium in place of the existing chromating treatment, and for the purpose of solving the problems mentioned above, it has been found that corrosion of a metal sheet can be effectively inhibited by using a rare earth metal element as a complex and/or salt with an organic compound for mixed dispersion in a layer on the metal sheet. As mentioned above, the prior art techniques are limited to water-soluble types wherein a complex of a rare earth metal element is used by being added to circulated water or the like, and no long-term corrosion resistance can be expected even when it is mixed in that form into a layer formed on a metal sheet. The present invention employs a rare earth metal element having a powerful anti-corrosion effect as a complex and/or salt of an organic compound to minimize the chemical interaction between the layer matrix component and other additives, while the structure of the matrix component is designed based on the solubility of the rare earth metal element as a complex and/or salt of an organic compound in water in the neutral range, thereby effectively bringing out the original functions of the components making up the layer.

In particular, for applicability to various different matrix components, it is designed such that the rare earth metal complex and/or salt is poorly water soluble in the neutral range so that elution out of the layer is inhibited to provide long-term corrosion resistance. It was found that if the rare earth metal complex and/or salt is designed to be water-soluble in the acidic range, the rare earth metal complex and/or salt will dissolve in response to pH drops at the sites where corrosion has occurred, so that a function is imparted which selectively repairs the corroding sections, such as worked sections or damaged sections.

In addition, by selecting the type of functional groups of the organic compound forming the complex and/or salt, a corrosion inhibiting function is imparted to the organic compound itself, thus reinforcing the anti-corrosion performance of the layer as a whole.

The gist of the present invention is as follows.

(1) A surface treated metal sheet characterized by being coated with a layer comprising, as main components, a complex and/or salt between a rare earth metal element and an organic compound having in the molecule one or more functional groups selected from among —O—, =O, —OH, —COOH, —NH$_2$, =NH, =N—, —SH, —SO$_3$H and phosphoric groups, and a matrix capable of physically holding said complex and/or salt and having adhesive power for metal sheets.

(2) A surface treated metal sheet according to (1) above, characterized in that the solubility of the complex and/or salt in water at pH 6–7 is no greater than 0.01 mol/l based on the rare earth metal element.

(3) A surface treated metal sheet according to (1) or (2) above, characterized in that the solubility of the complex and/or salt in water at pH 3 and below is at least 0.1 mol/l based on the rare earth metal element.

(4) A surface treated metal sheet according to (1) to (3) above, characterized in that the rare earth metal element is a lanthanoid and/or yttrium.

(5) A surface treated metal sheet according to (1) to (4) above, characterized in that the organic compound forming the complex and/or salt is an organic compound including in the molecule one or more basic functional groups selected from among —NH$_2$, =NH and =N—, and one or more functional groups selected from among —O—, =O, —SH, —OH, —COOH, —SO$_3$H and phosphoric groups.

(6) A surface treated metal sheet according to (1) to (5) above, characterized in that the solubility of the organic compound forming the complex and/or salt in water at pH 6–7 is no greater than 0.01 mol/l.

(7) A surface treated metal sheet according to (1) to (6) above, characterized in that the matrix is a resin.

(8) A surface treated metal sheet according to (1) to (6) above, characterized in that the matrix is ortho-phosphoric acid and/or polyphosphoric acid.

(9) A surface treated metal sheet according to (1) to (6) above, characterized in that the matrix is an oxyacid compound or hydrogen oxyacid compound of a rare earth metal element, or a mixture thereof.

(10) A surface treated metal sheet according to (9) above, characterized in that the matrix is a phosphoric acid compound or hydrogen phosphoric acid compound of yttrium, lanthanum and/or cerium, or a mixture thereof.

(11) A surface treated metal sheet according to (1) to (6) above, characterized in that the matrix is an inorganic colloid.

(12) A metal surface treatment solution characterized by comprising, as main components, a complex and/or salt between an organic compound having in the molecule one or more functional groups selected from among —O—, =O, —OH, —COOH, —NH$_2$, =NH, =N—, —SH, —SO$_3$H and phosphoric groups and a rare earth metal element, and a layer matrix-forming component.

(13) A metal surface treatment solution according to (12) above, characterized in that the solubility of the complex and/or salt in water at pH 6–7 is no greater than 0.01 mol/l based on the rare earth metal element.

(14) A metal surface treatment solution according to (12) or (13) above, characterized in that the solubility of the complex and/or salt in water at pH 3 and below is at least 0.1 mol/l based on the rare earth metal element.

(15) A metal surface treatment solution according to (12) to (14) above, characterized in that the rare earth metal element is a lanthanoid and/or yttrium.

(16) A metal surface treatment solution according to (12) to (15) above, characterized in that the organic compound forming the complex and/or salt is an organic compound including in the molecule one or more basic functional groups selected from among —NH$_2$, =NH and =N—, and one or more functional groups selected from among —O—, =O, —SH, —OH, —COOH, —SO$_3$H and phosphoric groups.

(17) A metal surface treatment solution according to (12) to (16) above, characterized in that the solubility of the organic compound forming the complex and/or salt in water at pH 6–7 is no greater than 0.01 mol/l.

(18) A metal surface treatment solution according to (12) to (17) above, characterized in that the matrix is a resin.

(19) A metal surface treatment solution according to (12) to (17) above, characterized in that the matrix is ortho-phosphoric acid and/or polyphosphoric acid.

(20) A metal surface treatment solution according to (12) to (17) above, characterized in that the matrix is an oxyacid compound or hydrogen oxyacid compound of a rare earth metal element, or a mixture thereof.

(21) A metal surface treatment solution according to (20) above, characterized in that the matrix is a phosphoric acid compound or hydrogen phosphoric acid compound of yttrium, lanthanum and/or cerium, or a mixture thereof.

(22) A metal surface treatment solution according to (12) to (17) above, characterized in that the matrix is an inorganic colloid.

BEST MODE FOR CARRYING OUT THE INVENTION

Figure 1:
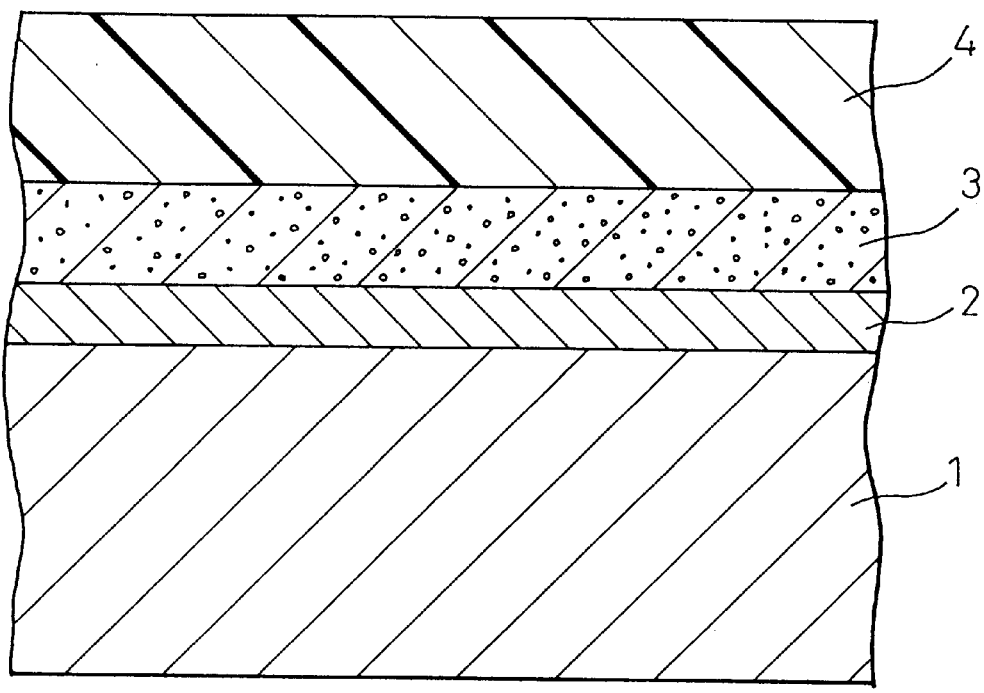
FIG. 1 is a schematic cross-sectional view of a surface treated metal sheet according to the invention.

The present invention will now be explained in greater detail.

As mentioned above, the complex and/or salt of the organic compound and rare earth metal element used for the invention is not restricted, but it has been developed as a rare earth element compound that is poorly soluble in water in the neutral range and is soluble in water in the acidic range, and in order to achieve this object it is generally preferred for the rare earth metal element to be complexed with specific organic compounds; however, the same object can be achieved with a salt of the rare earth metal element and a specific organic compound. For simplicity of terms, the complex and/or salt of the organic compound and rare earth metal element used for the invention will hereunder be referred to as "rare earth metal complex".

Rare earth metal elements have anti-corrosion functions, although the mechanism thereof is not clear. Any rare earth metal element may be used in the rare earth metal complex (i.e. the complex and/or salt of the organic compound and rare earth metal element) used for the invention, and there are no particular restrictions on the valency of the rare earth metal at the time the rare earth metal complex is formed. Lanthanoids and/or yttrium are preferred from the standpoint of ease of handling, while from an economical standpoint, lanthanum or cerium is preferred, and tetravalent cerium which also has oxidizing power is even more preferred.

The organic compound forming the rare earth metal complex used for the invention need only be one that can exist stably as a rare earth metal complex in the treatment solution and in the layer, and it can effectively bring out the anti-corrosion function of the rare earth metal in corrosive environments. Specifically, it is preferred to be an organic compound having in the molecule one or more functional groups selected from among —O—, =O, —OH, —COOH, —NH$_2$, =NH, =N—, —SH, —SO$_3$H and phosphoric groups. Including these functional groups in the molecule will form a rare earth metal complex in the treatment solution and layer, thus stabilizing them and inhibiting the interaction between the matrix components and additives. This makes it possible to more effectively bring out the anti-corrosion function of the rare earth metal. In the case of a complex, there is no problem if it also contains an inorganic compound as a ligand in addition to the organic compound. As examples of such inorganic compounds there may be mentioned phosphoric compounds such as H$_3$PO$_4$, H$_2$PO$_4^-$, HPO$_4^{2-}$, PO$_4^{3-}$, etc., sulfuric compounds such as H$_2$SO$_4$, HSO$_4^-$, SO$_4^{2-}$, etc., nitric compounds such as HNO$_3$, NO$_3^-$, etc., H$_2$O, OH$^-$, and the like.

The rare earth metal complex used for the invention is preferably one that is poorly soluble in the neutral range, in order to impart long-term corrosion resistance in general use.

Specifically, the solubility of the rare earth metal complex in water at pH 6–7 is preferably no greater than 0.01 mol/l based on the rare earth metal element. If the solubility at pH 5–8 is no greater than 0.01 mol/l based on the rare earth metal element, as is more preferred, it will be possible to further maintain long-term corrosion resistance.

If the solubility in water at pH 6–7 is greater than 0.01 mol/l, the rare earth metal complex will readily elute from the layer in humid environments including rainwater and dew, so that the long-term anti-corrosion performance in humid environments will be reduced unless the structure of the matrix components is modified. In the case of a rare earth metal complex having a solubility in water at pH 6–7 exceeding 0.01 mol/l, the corrosion resistance can be maintained over long periods if the matrix structure is selected from non-water-soluble copolymer resins, telechelic resins, core/shell-type emulsion resins, non-water-soluble curable resins and oxyacid compounds of rare earth metal elements. Non-water-soluble copolymer resins, telechelic resins and core/shell-type emulsion resins have a molecular skeleton that exhibits high affinity for water and attaches to metal surfaces by adsorption, hydrogen bonding, etc. with the remainder a construction having a molecular skeleton with no affinity for water, as described below. Non-water-soluble curable resins are formed during the treatment layer formation by curing the coating material which includes water-soluble resin and closslinking agents.

When using a poorly water-soluble rare earth metal complex, the anti-corrosion performance can be further improved by using colloid or micelle fine particles. The size of the colloid or micelle fine particles in this case must be sufficiently small with respect to the layer thickness. If the particle size is too large for incorporation into the matrix composing the layer, then most of the rare earth metal complex will be exposed on the layer surface, resulting in gradual loss of the rare earth metal complex out of the layer as the characteristic solution equilibrium of the substance is maintained over the long term in humid environments. When the layer is worked, the presence of large particles in the layer will cause peeling at the interface with the matrix, thus notably reducing the coating property of the layer. Consequently, if the colloid particles are too large it will not be possible to maintain the steel sheet performance, including long-term corrosion resistance of the flat sheets and worked sections. In other words, to maintain long-term corrosion resistance it is necessary for the size of the colloid or micelle particles to be sufficiently small with respect to the layer thickness, for incorporation into the layer matrix. Considering the layer thickness required for environments in which the surface treated metal sheet of the invention is to be used, the mean particle size of the colloids or micelles is preferably no greater than 1 $\mu$m, more preferably no greater than 0.5 $\mu$m and even more preferably no greater than 0.3 $\mu$m.

In order to impart corrosion resistance to worked sections and damaged sections when the solubility is poor in the neutral range, a rare earth metal complex which is water-soluble in the acidic range is preferred. Specifically, it is preferred for the solubility of the rare earth metal complex at pH 3 and below to be at least 0.1 mol/l based on the rare earth metal element. If it is at least 0.1 mol/l the rare earth metal complex will dissolve in response to lower pH resulting from corrosion reaction at sites of corrosion, thus making it possible to impart a selective repair function for corroding sections, such as worked sections or injured sections. At less than 0.1 mol/l the rare earth metal complex will be insufficiently supplied to the sites of corrosion when the layer is damaged by severe working or is exposed to very severe corroding environments, thus reducing the corrosion resistance.

Furthermore, by using an organic compound having in the molecule one or more basic functional groups selected from among —NH$_2$, =NH and =N— and one or more functional groups selected from among —O—, =O, —OH, —COOH, —SH, —SO$_3$H and phosphoric groups, it is possible to impart a corrosion-inhibiting effect to the organic compound itself to thus reinforce the anti-corrosion performance. More preferably, it is an organic compound having in the molecule one or more basic functional groups selected from among —NH$_2$, =NH and =N— and two or more functional groups selected from among —O—, =O, —OH, —COOH, —SH, —SO$_3$H and phosphoric groups. Since such an organic compound adheres to metal surfaces, it can effectively supply the rare earth metal to the metal sheet surface and, even after dissociating from the rare earth metal element in the layer when corrosion proceeds, it forms a complex with the dissolved metal component of the metal sheet and precipitates, thus inhibiting further ionization of the metal sheet.

The organic compound forming the aforementioned rare earth metal complex is preferably one that is poorly soluble in the neutral range, and this can be regulated by controlling the balance between the amount of hydrophilic functional groups and the amount of hydrophobic skeletons. If the solubility in water is no greater than 0.01 mol/l at pH 6–7, the organic compound will be retained in the layer over long periods even after it has released and dissociated the rare earth metal in the layer, thus allowing it to function as an organic compound corrosion inhibitor. As preferred examples of such organic compounds there may be mentioned thioglycolic acid esters, N-substituted derivatives of 2,5-dimethylpyrrole, 8-hydroxyquinoline derivatives, triazinethiol derivatives, mercaptocarboxylic acids, salicylic acid and thiosalicylic acid derivatives, sulfobenzoic acid derivatives, catechol derivatives, pyridine derivatives such as hydroxypyridine, nicotinic acid and mercaptonicotinic acid, organic phosphoric compounds such as di-(2-ethylhexyl)phosphoric acid, 2-ethylhexyl-2-ethylhexyl phosphorous acid and bis(2,4,4-trimethylpentyl) phosphorous acid, and gallic acid ester derivatives, cyclodextrin, and the like.

The rare earth metal complex used for the invention may be added for use as one type to the same layer, or it may be added for use as a plurality of rare earth metal complexes with different rare earth metal elements or organic compounds. Addition of a plurality of rare earth metal complexes can provide adaptability to a wider range of different corroding environments, but in practical terms since the layer thickness must be restricted for the required properties including production cost and weldability, the amount and type must therefore be optimized to limit the absolute amount of rare earth metal complex added to the layer per unit area.

The amount of the rare earth metal complex included in the layer on the metal sheet cannot be strictly specified since the required amount will differ depending on the corrosion resistance of the layer matrix itself, but it is satisfactory at at least 1 mg/m$^2$ based on the rare earth metal. At less than 1 mg/m$^2$ the effect of addition will be inadequate and no improvement in corrosion resistance will be seen in the layer. However, the corrosion resistance-improving effect will become saturated if added at over 10 g/m$^2$, and therefore 10 g/m$^2$ is sufficient from economic considerations. The form of the rare earth metal complex present in the treatment solution will depend on the solvent used and the pH, temperature and concentration, but a dissolved form or a colloid, micelle or emulsion form finely dispersed in the treatment solution is preferred. Otherwise, the dispersed state of the rare earth metal complex will become non-uniform during formation of the layer, thus tending to result in corrosion at locations where the rare earth metal complex is present in smaller amounts.

The layer matrix used for the invention is not particularly restricted so long as it is a material which does not notably impair the stability of the rare earth metal complex, and which physically holds the rare earth metal complex in the layer on the metal surface and attaches to the metal sheet. As preferred examples there may be mentioned resins, inorganic colloids, phosphoric acid, polyphosphoric acid, metaphosphoric acid, and oxyacids or hydrogen oxyacids of the rare earth metal element. There is also no problem with using these in combinations.

When a resin is used in the matrix, examples of common ones include acrylic, epoxy, olefin and ionomer types, and the form may be appropriately selected from among water-soluble resins and water-dispersed emulsion resins, latexes, and the like.

As preferred resin structures there may be mentioned a non-water-soluble copolymer resin and a telechelic resin or core/shell-type emulsion resin having a molecular skeleton that exhibits high affinity for water and attaches to metal surfaces by adsorption, hydrogen bonding, etc., with the remainder a construction having a molecular skeleton with no affinity for water, or a non-water-soluble curable resin formed during the treatment layer formation by curing the coating material which includes water-soluble resin and closslinking agents.

The reason that resins with this type of structure are preferred is that their skeletons have gas barrier properties, ion permeation resistance, coating adhesion properties, fingerprint resistance, adhesion to metal surface and working properties, and exhibit their properties stably even in the form of layers. Especially when the rare earth metal complex is water-soluble in the neutral range, a network of molecular skeletons with no affinity for water in the layer can provide an effect that inhibits elution of the rare earth metal complex out of the layer. Even when the rare earth metal complex is poorly water-soluble in the neutral range, stable dispersion of the colloids or micelles of the rare earth metal complex is ensured, and the molecular skeleton portion with affinity for water absorbs a trace amount of water in corroding environments, thus acting as a site for dissolution and functioning of the rare earth metal complex.

This type of resin structure is therefore preferred, and in the case of non-water-soluble copolymer resins, the resin compositions are those of copolymer resins with vinyl-based or olefin-based compounds as the monomers, which are produced by solution, bulk, interfacial, suspension or emulsion polymerization methods. For example, it is a copolymer resin comprising a main skeleton of a polymer composed of a non-hydrated vinyl-based or olefin-based monomer and having at both ends an organic polymer such as a vinyl-based carboxylic acid, vinyl-based amine, vinyl-based sulfonic acid, vinyl-based alcohol, vinylphenol, vinyl-based phosphate, etc. with high affinity for water and metal surfaces; or a telechelic resin having a group with affinity for water or metal surfaces introduced at both ends using a chain transfer agent in the polymerization process for the non-hydrated skeleton portion; or an emulsion resin having a polymer of a non-hydrated vinyl-based or olefin-based monomer as the core phase and a polymer of a monomer with high affinity for water or metal surfaces as the shell phase.

For these copolymer resins, telechelic resins and core/shell-type emulsion resins, it is preferred for the weight ratio between the skeleton portion with high affinity for water or metal surfaces and the non-hydrated skeleton portion to be higher to ensure adhesion with metal surfaces, but if it is too high the water absorption will increase, causing undesirable layer peeling due to water swelling, while if it is too low the coating adhesion will be undesirably impaired. The weight ratio is therefore preferably adjusted between 3/100–3/2, and even more preferably between 1/20–1/1. There is no restriction to these resins, and there is no problem with using resins employed for other water-dispersed coating materials.

In the case of a water-soluble resin, it is a polymer of a water-soluble vinyl-based monomer, a water-soluble resin composed of a polymer of a water-soluble vinyl-based monomer, or a water-soluble vinyl-based resin composed of a copolymer of a water-soluble vinyl-based monomer and a non-water-soluble vinyl based monomer, and has a skeleton that includes a crosslinkable functional group (unsaturated bond, etc.) so that crosslinking will occur between the high molecular complexes by the curing agent to render the resin non-water-soluble. A polar group-containing monomer may also be used as the water-soluble vinyl-based monomer.

The term "polar group" includes proton donor groups such as —COOH, —SO$_3$H, —P(O) (OH)$_2$, —OH, etc. and to salts and esters thereof, and proton acceptor groups such as —NH$_2$, —NHR, —NRR' (where R and R' are alkyl groups or allyl groups), as well as quaternary ammonium salt groups with ionic bonds and ambivalent polar groups including both proton donor and acceptor groups; vinyl-based compounds wherein these polar groups are introduced alone or in combinations may be used as monomers. As non-water-soluble vinyl-based monomers there may be used one or more selected from among styrene, α-methylstyrene, vinyltoluene, chlorostyrene, alkyl (meth)acrylates, allyl (meth)acrylates, etc.

The amount of the non-water-soluble vinyl-based polymer skeleton is not particularly restricted since its introduction is carried out for the purpose of adjusting the total water solubility of the polymer and adjusting the degree of crosslinking upon curing, but its introduction is preferably adjusted so that the solubility of the total polymer in water is 5 wt % or greater, and more preferably 10 wt % or greater, at 25° C. and normal pressure. The polymer can be produced using any one or more of these monomers. There is also no problem with introducing the aforementioned functional groups into the non-water-soluble polymer for water-solubilization. The crosslinking agent may be any commonly used amine, carboxylic acid, block isocyanate or the like, and urethane bonds, acid amide bonds, ester bonds or the like may be formed between the high molecular complexes for crosslinking to render it non-water-soluble.

When an inorganic colloid is used as the matrix, it may be a generally available commercial inorganic colloid such as silica, alumina, titania, ceria, etc. The oxyacid compound of the rare earth metal element encompasses compounds formed between oxyacid anions such as phosphate ion, tungstate ion, vanadate ion, etc. and rare earth metal elements, and the hydrogen oxyacid compound encompasses compounds including hydrogen in a part of the cation. Because these oxyacid compounds and/or hydrogen oxyacid compounds form paste-like and probably non-crystalline (amorphous) inorganic polymers, they have working follow-up properties even when formed into layers and can control corrosion due to their barrier effect, while excess oxyacid can form an oxyacid salt layer-type passive layer or an oxide layer-type passive layer, thus making it possible to obtain an inorganic-based corrosion resistance chemical treatment layer with even better anti-corrosion performance.

The rare earth metal element may be lanthanum, cerium, or yttrium, and lanthanum is particularly suitable. Cerium is also effective for inhibiting cathodic reaction, and using tetravalent cerium will further increase this effect. Suitable oxyacid compounds include phosphoric compounds and/or hydrogen phosphoric compounds, and the phosphoric acid type may be ortho-phosphoric acid, meta-phosphoric acid or polyphosphoric acid. Hydrogen polyphosphoric acid compounds are especially preferred.

The layer is in a paste form, and it is assumed that a non-crystalline (amorphous) inorganic polymer will probably be formed. However, crystalline particles may also be present among the non-crystals.

In the layer of the oxyacid compound or hydrogen oxyacid compound of the rare earth metal element, or the mixture thereof, the molar ratio of rare earth metal element ions to oxyacid ions (in the case of hydrogen oxyacid compound, or in the case of a mixture containing one, it is based on oxyacid ions) is generally 0.5–100, preferably 2–50 and more preferably 5–10. At less than 0.5 the working follow-up property will not be sufficient, and at greater than 100 the layer forming property will be reduced. The source for the rare earth element is not particularly restricted, and rare earth element compounds such as oxides, acetates, carbonates, chlorides, fluorides may be mentioned, with oxides being preferred.

A layer (matrix) composed mainly of an oxyacid compound or hydrogen oxyacid compound of a rare earth metal element, or a mixture thereof, is disclosed in PCT/JP96/03670 (filing date: Feb. 4, 1997). The contents thereof are incorporated by reference herein.

There may also be added to the layer and treatment solution of the invention phosphoric acid or polyphosphoric acid as passivation layer-forming aids, or calcium hydroxide, calcium carbonate, calcium oxide, zinc phosphate, potassium phosphate, calcium phosphate, lanthanum phosphate, lanthanum hydrogen phosphate, cerium phosphate, cerium hydrogen phosphate, calcium silicate, zirconium silicate, aluminum phosphate, zirconium phosphate, $TiO_2$, $SiO_2$, $Al_2O_3$, $La_2O_3$, $CeO_2$, etc. as additional additives.

The treatment solution for formation of the layer of the invention basically comprises a rare earth metal complex, a matrix component and a solvent, and the concentration and pH of the treatment solution are not particularly restricted. The solvent can be selected from among any aqueous or volatile organic compounds. However, aqueous types are preferred in consideration of the production environment.

The layer thickness will depend on the use and therefore cannot be restricted, but it is preferred to be at least 0.1 μm. It is more preferably at least 0.3 μm and even more preferably at least 0.5 μm. At smaller than 0.1 μm the corrosion resistance will be insufficient. However, since the improving effect on corrosion resistance is saturated if the layer thickness is over 10 μm, it is sufficiently at less than 10 μm from an economical standpoint.

Depending on the purpose, there is no problem with covering the layer of the invention with an overcoat layer composed of a resin, paint, inorganic substance or a mixture thereof.

The metal sheet used as the object of the invention is not particularly restricted, and for example surface-treated steel sheets and cold-rolled steel sheets including hot-dipped plated steel sheets such as hot-dipped galvanized steel sheets, hot-dipped zinc-iron alloy-plated steel sheets, hot-dipped zinc-aluminum alloy-plated steel sheets, hot-dipped zinc-aluminum-magnesium alloy-plated steel sheets, hot-dipped aluminum-silicon alloy-plated steel sheets and hot-dipped lead-tin alloy-plated steel sheets; electroplated steel sheets such as electrogalvanized steel sheets, zinc-nickel alloy-electroplated steel sheets, zinc-iron alloy-electroplated steel sheets and zinc-chromium alloy-electroplated steel sheets; as well as zinc, aluminum or magnesium metal sheets, etc. may be used.

FIG. 1 shows an example of a surface treated metal sheet according to the invention. In this drawing, 1 is a steel sheet, 2 is a zinc plating layer, 3 is a surface treated layer containing a complex and/or salt of an organic compound and rare earth metal element according to the invention in a matrix, and 4 is an overcoat layer layer which is optionally formed.

EXAMPLES

Rare Earth Metal Complexes and Salts (1) Catechol-rare earth metal complexes Yttrium nitrate, lanthanum nitrate, cerium (III) nitrate, ammonium cerium (IV) nitrate and neobium nitrate were each added to an aqueous solution of catechol ($C_6H_4(OH)_2$) in an equimolar amount with respect to the catechol, and a stirrer was used for stirring overnight to obtain a catechol-rare earth metal complex colloid solution of each. The mean particle size of the catechol-cerium (IV) complex colloid was 0.39 μm.

(2) Trifluoromethanesulfonic acid-rare earth metal salts

Yttrium triflate (reagent: product of Aldrich Co.), lanthanum triflate (reagent: product of Aldrich Co.), cerium triflate (reagent: product of Aldrich Co.) and neobium triflate (reagent: product of Aldrich Co.) were used.

(3) Di-(2-ethylhexyl)phosphoric acid-rare earth metal complexes

Di-(2-ethylhexyl)phosphoric acid was dissolved in acetone, and then aqueous solutions of yttrium nitrate, lanthanum nitrate, cerium (III) nitrate and neobium nitrate were added thereto to obtain di-(2-ethylhexyl)phosphoric acid-rare earth metal complex emulsion solutions.

(4) 2-hydroxypyridine-rare earth metal complexes A phosphoric solution of 2-hydroxypyridine was prepared, and then yttrium nitrate, lanthanum nitrate, cerium (III) nitrate, ammonium cerium (IV) nitrate and neobium nitrate aqueous solutions were each mixed therewith and heated at 80° C. for 3 hours to obtain phosphoric acid-containing 2-hydroxypyridine-rare earth metal complexes.

(5) 2-mercaptonicotinic acid-rare earth metal complexes

A phosphoric solution of 2-mercaptonicotinic acid was prepared, and then yttrium chloride, lanthanum chloride and cerium chloride aqueous solutions were each mixed therewith and heated at 80° C. for 3 hours to obtain phosphoric acid-containing 2-mecaptonicotinic acid-rare earth metal complexes.

(6) 2-hydroxynicotinic acid-rare earth metal complexes

With an aqueous solution of sodium 2-hydroxynicotinate there were mixed aqueous solutions of yttrium nitrate, lanthanum nitrate, cerium (III) nitrate, ammonium cerium (IV) nitrate and neobium nitrate, to obtain 2-hydroxynicotinic acid-rare earth metal complex colloids. The mixing speed was varied during mixing of the ammonium cerium (IV) nitrate aqueous solution, giving colloid solutions with mean particle sizes of 0.96 μm, 0.41 μm and 0.18 μm.

(7) γ-cyclodextrin-rare earth metal complexes

An aqueous solution of ammonium cerium (IV) nitrate was added to an aqueous solution of γ-cyclodextrin to obtain a γ-cyclodextrin-rare earth metal complex aqueous solution.

Table 1 shows the dissolution performance in water for each of the above-mentioned rare earth metal complexes.

TABLE 1

| Complex No. | Rare earth metal | Organic compound | Complex/salt solubility pH 6–7 | Complex/salt solubility ≦pH 3 | Organic compound solubility pH 6–7 |
|---|---|---|---|---|---|
| Y-OTf | Y | trifluoromethane sulfonic acid | C | C | C |
| La-OTf | La | trifluoromethane sulfonic acid | C | C | C |
| Ce(III)-OTf | Ce(III) | trifluoromethane sulfonic acid | C | C | C |
| Nd-OTf | Nd | trifluoromethane sulfonic acid | C | C | C |

TABLE 1-continued

| Complex No. | Rare earth metal | Organic compound | Complex/salt solubility pH 6–7 | Complex/salt solubility ≦pH 3 | Organic compound solubility pH 6–7 |
|---|---|---|---|---|---|
| Y-Cat | Y | catechol | A | B | C |
| La-Cat | La | catechol | A | B | C |
| Ce(III)-Cat | Ce(III) | catechol | A | B | C |
| Ce(IV)-Cat | Ce(IV) | catechol | A | B | C |
| Nd-Cat | Nd | catechol | A | B | C |
| Y-DEHPA | Y | di-(2-ethylhexyl)phosphoric acid | A | A | A |
| La-DEHPA | La | di-(2-ethylhexyl)phosphoric acid | A | A | A |
| Ce(III)-DEHPA | Ce(III) | di-(2-ethylhexyl)phosphoric acid | A | A | A |
| Nd-DEHPA | Nd | di-(2-ethylhexyl)phosphoric acid | A | A | A |
| Y-2HP | Y | 2-hydroxypyridine | A | C | B |
| La-2HP | La | 2-hydroxypyridine | A | C | B |
| Ce(III)-2HP | Ce(III) | 2-hydroxypyridine | A | C | B |
| Nd-2HP | Nd | 2-hydroxypyridine | A | C | B |
| Y-2MN | Y | 2-mercaptonicotinic acid | A | C | A |
| La-2MN | La | 2-mercaptonicotinic acid | A | C | A |
| Ce(III)-2MN | Ce(III) | 2-mercaptonicotinic acid | A | C | A |
| Y-2HN | Y | 2-hydroxynicotinic acid | A | C | A |
| La-2HN | La | 2-hydroxynicotinic acid | A | C | A |
| Ce(III)-2HN | Ce(III) | 2-hydroxynicotinic acid | A | C | A |
| Ce(IV)-2HN | Ce(IV) | 2-hydroxynicotinic acid | A | C | A |
| Nd-2HN | Nd | 2-hydroxynicotinic acid | A | C | A |
| Ce(IV)-CyD | Ce(IV) | γ-cyclodextrin | C | C | C |

Solubility: A: 0.01 mol/l or less, B: greater than 0.01 mol/l and less than 0.1 mol/l, C: 0.1 mol/l or greater Layer Matrix (A) Acrylic emulsion A commercially available water-dispersed acrylic emulsion resin (product of Japan Synthetic Rubber, resin solid portion=50 wt %) was used.

(B) SBR latex

A commercially available water-dispersed SBR latex (product of Japan Synthetic Rubber, resin solid weight=50 wt %) was used.

(C) Lanthanum phosphate

Lanthanum oxide and polyphosphoric acid (products of Showa Chemical Co., average molecular weight= approximately 338) were thoroughly mixed at a proportion of 1/3 as the molar ratio of La/P and then heated at 150° C. for 12 hours.

(D) Colloidal silica

Commercially available colloidal silica (product of Nissan Chemical Co., solid portion=20 wt %, pH 2) was used.

(E) Polyphosphoric acid

Commercially available polyphosphoric acid (product of Wako Junyaku Kogyo Co., average molecular weight=338) was used.

(F) Telechelic resins

Mercaptopropionic acid, mercaptoethanol, etc. were used as chain transfer agents in reaction processes for anionic polymerization for poly(styrene/methyl methacrylate/n-butyl methacrylate/n-butyl acrylate), to introduce alcoholic hydroxyl groups and carboxyl groups at both ends of acrylate monomer copolymers. Using 5 parts by weight of styrene, 5 parts by weight of methyl methacrylate, 15 parts by weight of n-butyl methacrylate and 75 parts by weight of n-butyl acrylate as monomers, these were charged into 500 parts by weight of the solvent tetrahydrofuran (THF), after which 1.5 parts by weight of 4,4'-azobis(4-cyanopentanoic acid) was added as a polymerization initiator and polymerization was carried out at 80° C. or below.

(G) Core/shell-type emulsion resin

A core/shell-type resin of styrene (5 parts by weight) - methyl methacrylate (5 parts by weight)-n-butyl methacrylate (10 parts by weight)-n-butyl acrylate (60 parts by weight)-methacrylic acid (6 parts by weight)-2-hydroxyethyl acrylate (8 parts by weight)-2-hydroxyethyl methacrylate (6 parts by weight) was prepared by emulsion polymerization. After charging 40 parts by weight of total monomer at the charging ratios shown in parentheses into 60 parts by weight of deionized water, there were added 0.2 part by weight of sodium dodecylbenzene sulfate as an emulsifying agent and 0.2 part by weight of ammonium persulfate as a catalyst, and an emulsion resin was prepared by vigorous stirring at 70° C.

(H) Water-soluble resin

After charging 15 parts by weight of 2-hydroxyethyl acrylate into 5 parts by weight of deionized water, 0.3 part by weight of ammonium persulfate was added as a catalyst and a water-soluble resin was prepared at 40° C. Separately, copolymers of 2-hydroxyethyl acrylate and acrylic acid and so on were prepared by the same method. Also, by the method described in the example of preparation of copolymer resins, copolymers of water-soluble monomers and non-water-soluble monomers, such as copolymers of 2-hydroxyethyl acrylate and n-butyl acrylate, were appropriately prepared in organic solvents and used by dissolution in water after purification. As curing agents there were used crosslinking agents including dicarboxylic acids such as adipic acid and terephthalic acid; diamines such as ethylenediamine and isocyanates such as polyoxyethylene diisocyanate.

Preparation of Treatment Solution

A bath was prepared by combining the aforementioned rare earth metal complex and layer matrix, with orthophosphoric acid or a cerium oxide sol solution (product of Johnson Mattey, 0.1 M/l nitric acid solution, solid portion: 50 g/l, dispersed by nonionic surfactant) as an additive. For comparison there was also prepared a bath with the layer matrix alone. The compositions of each prepared bath are shown in Tables 2 and 3. The prepared bath concentration was consistently 10 g/l of the rare earth metal complex based on the rare earth metal, 100 g/l of the layer matrix based on the solid portion, 20 g/l of orthophosphoric acid based on $H_3PO_4$ and 5 g/l of the cerium oxide sol based on $CeO_2$.

TABLE 2

Treatment solution compositions

| No. | Complex, salt | Mean particle size | Layer matrix | Additives |
|---|---|---|---|---|
| Examples |||||
| 1 | Y-OTf | | acrylic emulsion | — |
| 2 | La-OTf | | acrylic emulsion | — |
| 3 | Ce(III)-OTf | | acrylic emulsion | — |
| 4 | Ce(III)-OTf | | SBR latex | — |
| 5 | Ce(III)-OTf | | SBR latex | $CeO_2$ |
| 6 | Ce(III)-OTf | | lanthanum phosphate | — |
| 7 | Ce(III)-OTf | | colloidal silica | — |
| 8 | Ce(III)-OTf | | colloidal silica | phosphoric acid |
| 9 | Ce(III)-OTf | | telechelic resin | — |
| 10 | Ce(III)-OTf | | core/shell emulsion resin | — |
| 11 | Ce(III)-OTf | | water-soluble resin | — |
| 12 | Nd-OTf | | acrylic emulsion | — |
| 13 | Y-Cat | | acrylic emulsion | — |
| 14 | La-Cat | | acrylic emulsion | — |
| 15 | La-Cat | | acrylic emulsion | phosphoric acid |
| 16 | La-Cat | | acrylic emulsion | phosphoric acid, $CeO_2$ |
| 17 | La-Cat | | SBR latex | — |
| 18 | La-Cat | | lanthanum phosphate | — |
| 19 | La-Cat | | lanthanum phosphate | $CeO_2$ |
| 20 | La-Cat | | colloidal silica | — |
| 21 | Ce(III)-Cat | | acrylic emulsion | — |
| 22 | Ce(IV)-Cat | 0.39 μm | acrylic emulsion | — |
| 23 | Nd-Cat | | acrylic emulsion | — |
| 24 | Y-DEHPA | | acrylic emulsion | — |
| 25 | Y-DEHPA | | SBR latex | — |
| 26 | Y-DEHPA | | SBR latex | phosphoric acid |
| 27 | Y-DEHPA | | lanthanum phosphate | — |
| 28 | Y-DEHPA | | colloidal silica | — |
| 29 | La-DEHPA | | acrylic emulsion | — |
| 30 | Ce(III)-DEHPA | | acrylic emulsion | — |
| 31 | Nd-DEHPA | | acrylic emulsion | — |
| 32 | Y-2HP | | polyphosphoric acid | — |
| 33 | La-2HP | | acrylic emulsion | — |
| 34 | La-2HP | | SBR latex | — |
| 35 | La-2HP | | lanthanum phosphate | — |
| 36 | La-2HP | | colloidal silica | — |
| 37 | La-2HP | | colloidal silica | phosphoric acid |
| 38 | La-2HP | | colloidal silica | $CeO_2$ |
| 39 | Ce(III)-2HP | | acrylic emulsion | — |
| 40 | Nd-2HP | | acrylic emulsion | — |
| 41 | Y-2MN | | lanthanum phosphate | — |
| 42 | La-2MN | | lanthanum phosphate | — |
| 43 | Ce(III)-2MN | | lanthanum phosphate | — |
| 44 | Y-2HN | | acrylic emulsion | — |
| 45 | La-2HN | | polyphosphoric acid | — |
| 46 | La-2HN | | SBR latex | — |
| 47 | La-2HN | | lanthanum phosphate | — |
| 48 | La-2HN | | colloidal silica | — |
| 49 | Ce(III)-2HN | | acrylic emulsion | — |
| 50 | Ce(IV)-2HN | 0.96 μm | acrylic emulsion | — |
| 51 | Ce(IV)-2HN | 0.41 μm | acrylic emulsion | — |
| 52 | Ce(IV)-2HN | 0.18 μm | acrylic emulsion | — |
| 53 | Ce(IV)-2HN | 0.18 μm | telechelic resin | — |
| 54 | Ce(IV)-2HN | 0.18 μm | core/shell emulsion resin | — |
| 55 | Ce(IV)-2HN | 0.18 μm | water-soluble | — |

TABLE 2-continued

Treatment solution compositions

| No. | Complex, salt | Mean particle size | Layer matrix | Additives |
|---|---|---|---|---|
| 56 | Ce(IV)-2HN | 0.18 μm | acrylic emulsion resin | phosphoric acid |
| 57 | Ce(IV)-2HN | 0.18 μm | acrylic emulsion | phosphoric acid, $CeO_2$ |
| 58 | Ce(IV)-2HN | 0.18 μm | SBR latex | — |
| 59 | Ce(IV)-2HN | 0.18 μm | lanthanum phosphate | — |
| 60 | Ce(IV)-2HN | 0.18 μm | colloidal silica | — |
| 61 | Nd-2HN | | acrylic emulsion | — |
| 62 | Ce(IV)-CyD | | telechelic resin | — |
| 63 | Ce(IV)-CyD | | core/shell emulsion resin | — |
| 64 | Ce(IV)-CyD | | water-soluble resin | — |

Comp. Exs.

| 65 | — | | acrylic emulsion | — |
|---|---|---|---|---|
| 66 | — | | SBR latex | — |
| 67 | — | | lanthanum phosphate | — |
| 68 | — | | colloidal silica | — |
| 69 | — | | telechelic resin | — |
| 70 | — | | core/shell emulsion resin | — |
| 71 | — | | water-soluble resin | — |
| 72 | | | chromate layer | |

Layer Formation Method

Each of the above-mentioned treatment baths was coated and dried onto a steel sheet to form a layer. The coverage onto the steel sheets was consistently about 0.5 μm in terms of the layer thickness. The steel sheets used were GI (hot-dipped galvanized steel sheets, plating coverage: 90 g/m²), EG (electrogalvanized steel sheets, plating coverage: 20 g/m²), SZ (hot-dipped zinc-aluminum alloy-plated steel sheets, plating coverage: 90 g/m², Zn/Al=95.2/4.8), AL (hot-dipped aluminum-silicon alloy-plated steel sheets, plating coverage: 120 g/m², Al/Si=90/10) and CR (cold-rolled steel sheets). For comparison with chromate-treated steel sheets there was prepared a bath of a treatment solution containing 30 g/l based on $CrO_3$ of partially starch-reduced chromic acid, 40 g/l $SiO_2$ and 20 g/l ortho-phosphoric acid as a chromating solution for coating and drying onto steel sheets to about 50 mg/m² based on metallic chromium, to form layers. The coating was accomplished using a bar coater, and drying was carried out at an atmosphere temperature of 200° C. for 30 seconds.

Evaluation of Layer Performance (1) The flat sheet corrosion resistance was evaluated by the rust production rate after spraying the sample with 5% salt water at 35° C. The spraying period was 10 days for GI, EG and SZ, 15 days for AL, and 5 days for CR. GI, EG, SZ and AL were evaluated by the white rust production rate, GR was evaluated by the red rust production rate. Scale: ⊚: No rust production ○: Rust production of less than 5%

Δ: Rust production of greater than 5%, less than 20%

: Rust production of greater than 20%

(2) After 7-mm Erichsen working of the sample and spraying with 5% salt water at 35° C., the worked section corrosion resistance was evaluated based on the area of rust production. The spraying period was 10 days for GI, EG and SZ and 15 days for AL for measurement of the white rust production rate, and 5 days for CR for measurement of the red rust production rate. Scale: ⊚: Rust production of 0%

○: Rust production of less than 5%

Δ: Rust production of greater than 5%, less than 20%

: Rust production of greater than 20%

(3) The coating adhesion was evaluated by the rate of the coat peeling area in a cross cut test (tape peeling on 1 mm square cross cut to 10×10) after coating and baking a melamine-alkyd paint on the sample to a thickness of about 20 μm and immersing it in boiling water for 30 minutes. Scale: ⊚: No peeling ○: Peeling rate of less than 5%

Δ: Peeling rate of greater than 5%, less than 20%

: Peeling rate of greater than 20% The results of these performance tests are shown in Tables 4 and 5. As Tables 4 and 5 clearly show, the treatment layers containing rare earth metal complexes and/or salts according to the invention exhibit performance comparable to that of the chromate layers of the comparative examples. They therefore exhibit excellent performance as chemical treatment layers that contain absolutely no hexavalent chromium.

TABLE 3

Metal sheet performance

| No. | Metal sheet | Corrosion resistance Flat sheet | Corrosion resistance Worked section | Coating adhesion |
|---|---|---|---|---|
| Examples | | | | |
| 1 | EG, GI | Δ | Δ | Δ |
| 2 | EG, GI | Δ | Δ | Δ |
| 3 | EG, GI | Δ | Δ | Δ |
| | SZ | ○ | Δ | x |
| | AL | ○ | Δ | x |
| | CR | Δ | Δ | Δ |
| 4 | EG, GI | Δ | Δ | x |
| 5 | EG, GI | Δ | Δ | Δ |
| 6 | EG, GI | ○ | ⊚ | ○ |
| 7 | EG, GI | Δ | x | Δ |
| 8 | EG, GI | ○ | x | Δ |
| 9 | EG, GI | ○-Δ | ○-Δ | Δ |
| 10 | EG, GI | ○ | ○-Δ | ○-Δ |
| 11 | EG, GI | Δ | ○-Δ | Δ |
| 12 | EG, GI | Δ | x | Δ |
| 13 | EG, GI | ○ | x | Δ |
| 14 | EG, GI | ○ | x | Δ |
| 15 | EG, GI | ○ | Δ | x |
| 16 | EG, GI | ○ | Δ | Δ |
| 17 | EG, GI | ○ | Δ | Δ |
| 18 | EG, GI | ⊚-○ | ○ | ○ |
| 19 | EG, GI | ⊚ | ⊚-○ | ○ |
| 20 | EG, GI | ○ | x | Δ |
| 21 | EG, GI | ○ | Δ | Δ |
| | SZ | ○ | Δ | x |
| | AL | ○ | Δ | x |
| | CR | Δ | x | Δ |
| 22 | EG, GI | ○ | Δ | Δ |
| 23 | EG, GI | ○ | x | Δ |
| 24 | EG, GI | ○ | x | ○ |
| 25 | EG, GI | ○ | Δ | Δ |
| 26 | EG, GI | ○ | Δ | Δ |
| 27 | EG, GI | ⊚ | ○ | ○ |
| 28 | EG, GI | ○ | x | Δ |
| 29 | EG, GI | ⊚ | x | Δ |
| 30 | EG, GI | ⊚ | ○-Δ | Δ |
| | SZ | ○ | Δ | Δ |

TABLE 3-continued

Metal sheet performance

| No. | Metal sheet | Corrosion resistance Flat sheet | Corrosion resistance Worked section | Coating adhesion |
|---|---|---|---|---|
| | AL | ◎ | ○-△ | △ |
| | CR | ○ | △ | ○ |
| 31 | EG, GI | ○ | x | △ |
| 32 | EG, GI | ○ | △ | ○ |
| 33 | EG, GI | ◎ | △ | △ |
| 34 | EG, GI | ○ | △ | △ |
| 35 | EG, GI | ◎ | ○ | ○ |
| 36 | EG, GI | ○ | △ | △ |
| 37 | EG, GI | ○ | ○ | △ |
| 38 | EG, GI | ◎ | △ | ○ |
| 39 | EG, GI | ◎ | ○-△ | △ |
| | SZ | ◎ | ○-△ | △ |
| | AL | ◎ | ○-△ | ○-△ |
| | CR | ○ | △ | △ |
| 40 | EG, GI | ○ | ○ | △ |
| 41 | EG, GI | ◎ | ○ | ○ |
| 42 | EG, GI | ◎ | ◎ | ○ |
| 43 | EG, GI | ◎ | ◎ | ◎ |
| | SZ | ◎ | ◎ | ○ |
| | AL | ◎ | ◎ | ○ |
| | CR | ◎ | ○ | ○ |
| 44 | EG, GI | ◎ | ◎-○ | ○ |
| 45 | EG, GI | ◎ | ○ | ○ |
| 46 | EG, GI | ◎ | ◎-○ | △ |
| 47 | EG, GI | ◎ | ◎ | ◎ |
| 48 | EG, GI | ◎ | ◎-○ | ○ |
| 49 | EG, GI | ◎ | ◎-○ | ○ |
| | SZ | ◎ | ◎-○ | ○ |
| | AL | ◎ | ◎-○ | ○ |
| | CR | ◎ | ○ | ○ |
| 50 | EG, GI | ◎-○ | ○ | ○ |
| 51 | EG, GI | ◎ | ○ | ◎-○ |
| 52 | EG, GI | ◎ | ◎-○ | ◎ |
| 53 | EG, GI | ◎ | ◎ | ◎-○ |
| 54 | EG, GI | ◎ | ◎ | ◎ |
| 55 | EG, GI | ◎ | ◎-○ | ◎ |
| 56 | EG, GI | ◎ | ◎ | ◎ |
| 57 | EG, GI | ◎ | ◎ | ◎ |
| 58 | EG, GI | ◎ | ◎ | ◎-○ |
| 59 | EG, GI | ◎ | ◎ | ◎ |
| | SZ | ◎ | ◎ | ◎ |
| | AL | ◎ | ◎ | ◎ |
| | CR | ◎ | ◎ | ◎ |
| 60 | EG, GI | ◎ | ◎ | ◎-○ |
| 61 | EG, GI | ◎ | ○ | ○ |
| 62 | EG, GI | ○-△ | ○-△ | △ |
| 63 | EG, GI | ○ | ○ | ○-△ |
| 64 | EG, GI | △ | ○-△ | △ |

Comp. Exs.

| 65 | EG, GI | x | x | x |
|---|---|---|---|---|
| 66 | EG, GI | x | x | x |
| 67 | EG, GI | ○ | ○ | ○ |
| 68 | EG, GI | x | x | x |
| 69 | EG, GI | x-△ | △ | ◎ |
| 70 | EG, GI | x-△ | △ | ◎ |
| 71 | EG, GI | x-△ | △ | ◎ |
| 72 | EG, GI | ○ | △ | ◎ |
| | SZ | ○ | △ | ◎ |
| | AL | ○ | △ | ○ |
| | CR | ○ | △ | ◎ |

Industrial Applicability

As explained above, a treatment layer containing a rare earth metal complex and/or salt according to the invention minimizes the chemical interaction between the rare earth metal element in the complex and/or salt and the layer matrix components or other additives, thus making it possible to effectively bring out their original functions and to exhibit performance comparable to that of layers containing hexavalent chromium. It thereby becomes possible to provide surface treated metal sheets and metal surface treatment solutions which have performance comparable to chromate layers and drastically reduced environmental effects.

Surface treated metal sheets of the invention are therefore useful for applications in automobiles, electrical appliances, building materials and the like.

What is claimed is:

1. A surface treated metal sheet characterized by being coated with a layer comprising, as main components, a complex and/or salt between a rare earth metal element and an organic compound having in the molecule at least one functional group selected from the group consisting of —O—, =O, —OH, —COOH, —NH$_2$, =NH, =N—, —SH, —SO$_3$H and phosphoric groups, and a matrix capable of physically holding said complex and/or salt and having adhesive power for metal sheets.

2. A surface treated metal sheet according to claim 1, characterized in that the solubility of said complex and/or salt in water at pH 6–7 is no greater than 0.01 mol/l based on the rare earth metal element.

3. A surface treated metal sheet according to claim 2, characterized in that the solubility of said complex and/or salt in water at pH 3 and below is at least 0.1 mol/l based on the rare earth metal element.

4. A surface treated metal sheet according to claim 1, characterized in that said rare earth metal element is a lanthanoid and/or yttrium.

5. A surface treated metal sheet according to claim 1, characterized in that said organic compound forming said complex and/or salt is an organic compound including in the molecule at least one basic functional group selected from the group consisting of —NH$_2$, =NH and =N—, and at least one functional group selected from the group consisting of —O—, =O, —SH, —OH, —COOH, —SO$_3$H and phosphoric groups.

6. A surface treated metal sheet according to claim 1, characterized in that the solubility of said organic compound forming said complex and/or salt in water at pH 6–7 is no greater than 0.01 mol/l.

7. A surface treated metal sheet according to claim 1, characterized in that said matrix is a resin.

8. A surface treated metal sheet according to claim 1, characterized in that said matrix is ortho-phosphoric acid and/or polyphosphoric acid.

9. A surface treated metal sheet according to claim 1, characterized in that said matrix is an oxyacid compound or hydrogen oxyacid compound of a rare earth metal element, or a mixture thereof.

10. A surface treated metal sheet according to claim 9, characterized in that said matrix is a phosphoric acid compound or hydrogen phosphoric acid compound of yttrium, lanthanum and/or cerium, or a mixture thereof.

11. A surface treated metal sheet according to claim 1, characterized in that said matrix is an inorganic colloid.

12. A metal surface treatment solution characterized by comprising, as main components, a complex and/or salt between an organic compound having in the molecule at least one functional group selected from the group consisting of —O—, =O, —OH, —COOH, —NH$_2$, =NH, =N—, —SH, —SO$_3$H and phosphoric groups and a rare earth metal element, and a layer matrix-forming component.

13. A metal surface treatment solution according to claim 12, characterized in that the solubility of said complex and/or salt in water at pH 6–7 is no greater than 0.01 mol/l based on the rare earth metal element.

14. A metal surface treatment solution according to claim 13, characterized in that the solubility of said complex and/or salt in water at pH 3 and below is at least 0.1 mol/l based on the rare earth metal element.

15. A metal surface treatment solution according to claim 12, characterized in that said rare earth metal element is a lanthanoid and/or yttrium.

16. A metal surface treatment solution according to claim 12, characterized in that said organic compound forming said complex and/or salt is an organic compound including in the molecule at least one basic functional group selected from the group consisting of —$NH_2$, =NH and =N—, and at least one functional group selected from the group consisting of —O—, =O, —SH, —OH, —COOH, —$SO_3H$ and phosphoric groups.

17. A metal surface treatment solution according to claim 12, characterized in that the solubility of said organic compound forming said complex and/or salt in water at pH 6–7 is no greater than 0.01 mol/l.

18. A metal surface treatment solution according to claim 12, characterized in that said matrix is a resin.

19. A metal surface treatment solution according to claim 12, characterized in that said matrix is ortho-phosphoric acid and/or polyphosphoric acid.

20. A metal surface treatment solution according to claim 12, characterized in that said matrix is an oxyacid compound or hydrogen oxyacid compound of a rare earth metal element, or a mixture thereof.

21. A metal surface treatment solution according to claim 20, characterized in that said matrix is a phosphoric acid compound or hydrogen phosphoric acid compound of yttrium, lanthanum and/or cerium, or a mixture thereof.

22. A metal surface treatment solution according to claim 12 above, characterized in that said matrix is an inorganic colloid.

* * * * *